United States Patent [19]

Bennett

[11] 4,028,975

[45] June 14, 1977

[54] BLADE GUARD LIFT FOR POWER SAW

[75] Inventor: James C. Bennett, Carlsbad, Calif.

[73] Assignee: Ralph S. Rosen, Los Angeles, Calif.

[22] Filed: July 22, 1976

[21] Appl. No.: 707,488

Related U.S. Application Data

[63] Continuation-in-part of Ser. No. 654,933, Feb. 3, 1976.

[52] U.S. Cl. .................................. 83/397; 83/478; 83/490; 83/544

[51] Int. Cl.² ...................... B27B 5/18; B23D 45/14

[58] Field of Search ................. 83/397, 471.3, 478, 83/490, 491, 544, 597

[56] References Cited

UNITED STATES PATENTS

| | | | |
|---|---|---|---|
| 1,411,045 | 3/1922 | Leaver, Jr. ........................... | 83/478 |
| 3,249,134 | 5/1966 | Vogl et al. ........................... | 83/478 |
| 3,821,918 | 7/1974 | Niehaus et al. .................... | 83/478 X |

Primary Examiner—Willie G. Abercrombie

[57] ABSTRACT

A motor operated power saw is mounted on a table by employment of a tiltable platform so that the saw is lowered to cutting position by manually depressing a handle. Surrounding the upper half of the saw blade is a composite guard consisting of a main guard and a movable nose guard which, when the blade is in elevated non-operating condition, cover the exposed portion of the blade. The main guard is pivotally mounted on the tiltable platform and is provided with a cam follower which, upon engagement with a cam track on the table, automatically elevates the main guard and accompanying nose guard as the blade is advanced through a cutting operation.

10 Claims, 4 Drawing Figures

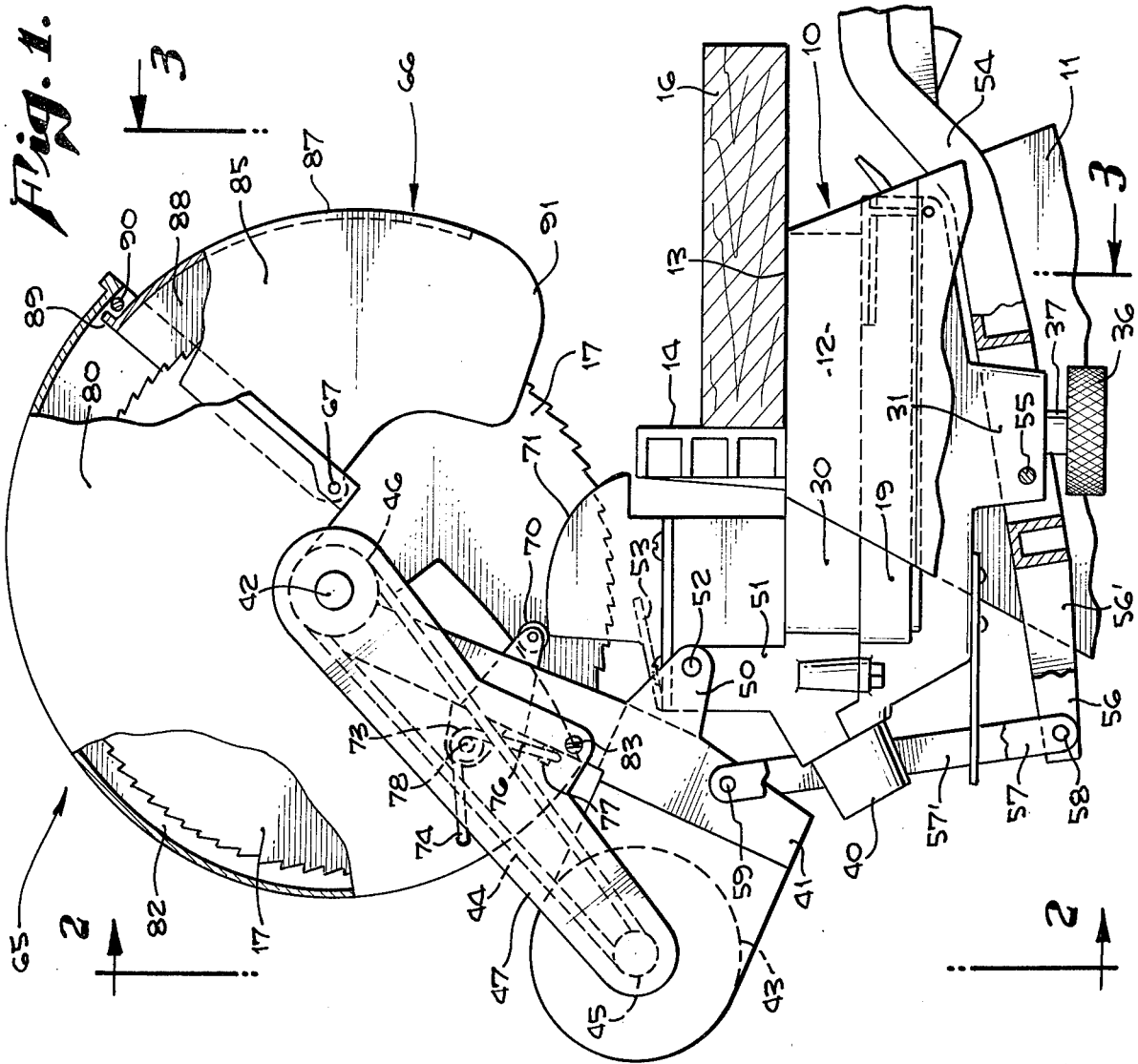
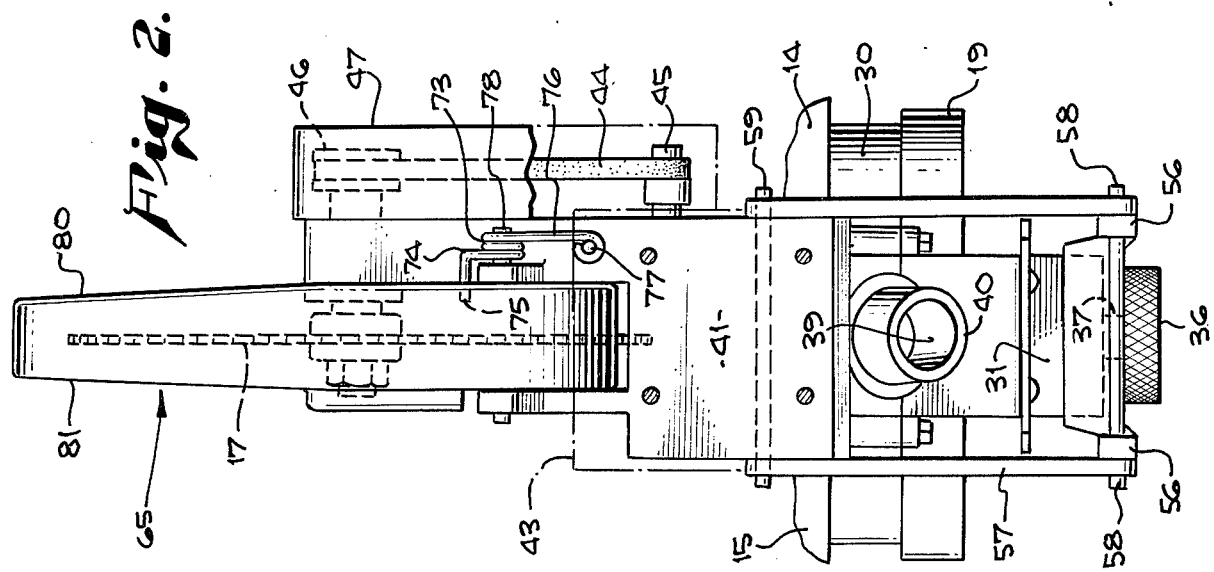

BLADE GUARD LIFT FOR POWER SAW

This is a continuation-in-part of Ser. No. 654,933 filed Feb. 3, 1976.

Power operated equipment of the kind here under consideration, when set up for a handyman's operation, such as a home workshop, needs to be small, compact, easily handled, thoroughly safe, and also of such character that it is within the budget of the average home workshop. Because such items of equipment are customarily of modest size permitting them to be mounted on a bench or table, it is helpful to have them so constructed that they cannot readily be overloaded and in any event, if overloaded, not subject to operation which would damage the equipment. Since persons operating such equipment often have no more than modest skill, and make no more than infrequent use of the equipment, safety features are especially important. Because servicing is a problem, it is highly advantageous to minimize the number of parts and confine relative movement of those parts which need to move to a scope no more than is necessary for customary average use. Also, it is highly advantageous to have movement occur automatically and in a positive and failsafe fashion. Although the guard lift of this disclosure is illustrated as applied to a miter saw, it is adaptable to a wide range of power actuated tools.

It is therefor among the objects of the invention to provide in a new and improved automatic, adjustable saw a blade guard which is simple and compact in its construction and simple in its operation, and which is equally well adapted to both a saw and other types of blade action tools.

Another object of the invention is to provide a new and improved blade guard which by reason of the structural relationship of essential moving parts movement of the parts is stabilized so as to assure a positive and accurate retraction when the tool is operated.

Another object of the invention is to provide a new and improved blade guard where the operator has a clear-cut view of all operations which are performed unobstructed by the location and movement of the guard.

Still another object of the invention is to provide a new and improved blade guard the structure of which is especially adapted to shift automatically away from the work without actually coming into contact with the work as the saw progresses through a work piece.

Still another object of the invention is to provide a new and improved two part blade guard wherein a relatively simply constructed movable part is pivotally attached to a relatively fixed part with both parts being mounted on a fixture which moves with the blade as the blade travels through a cutting cycle and which adequately protects the operator at all times.

Still further among the objects of the invention is to provide a rugged, simple and substantially inexpensive composite blade guard for a saw having relatively few parts, assembled in a compact arrangement and of such character that the device operates with an abundance of precision in a thoroughly safe and protecting fashion while at the same time being one of relatively low cost.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 1 is a side elevational view of a power saw provided with the nose guard.

FIG. 2 is a rear end elevational view on the line 2—2 of FIG. 1.

FIG. 3 is a front end elevational view on the line 3—3 of FIG. 1.

FIG. 4 is a side elevational view similar to FIG. 1 but with the guard in lifted position.

Figures 3, 4:
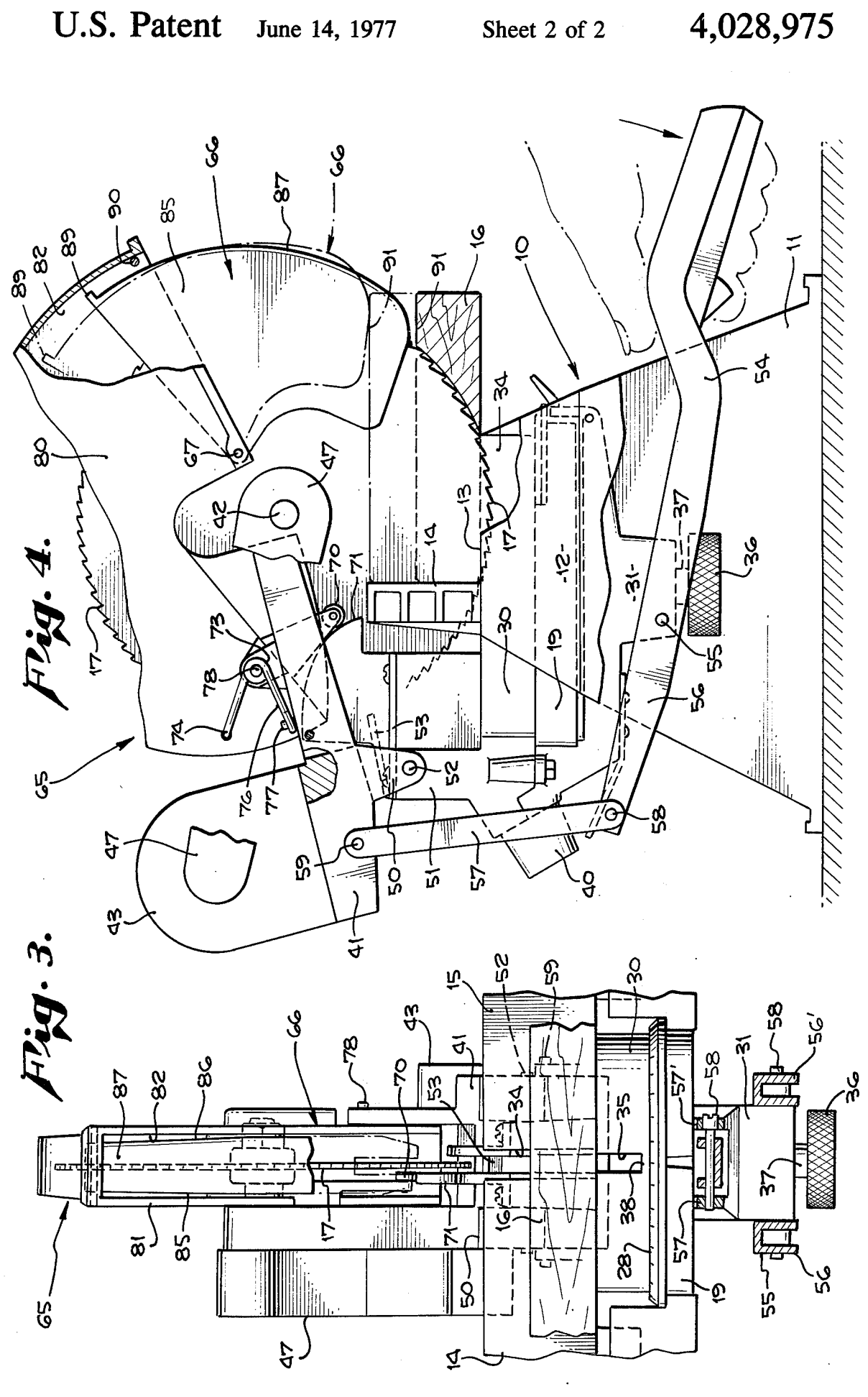

In an embodiment of the invention chosen for the purpose of illustration, there is shown a frame consisting of a horizontal work table assembly 10 and supported by legs 11 and 12 presenting a work surface 13. Extending along the rear of the work table assembly is a work guide consisting of parts 14 and 15. The work table assembly is adapted to support a work piece 16 for cutting by use of a circular saw blade 17. The saw blade is adapted to be swung from an elevated position, removed from the work as shown in FIG. 1, downwardly through a cutting position as shown in FIG. 4, and further if need be to sever one end of a work piece 16 from the other. There is a blade clearance 18 between the parts 14 and 15.

Included among the stationary portions of the device as part of the work table assembly is a reference plate 19, a 99° segment of which may be graduated in degrees forming a scale 28. Details of the reference plate are disclosed in the copending application, Ser. No. 654,933, filed Feb. 3, 1976.

A substantial portion of the operating mechanism for the power operated saw is embodied in what may be termed a turntable or in the alternative a positioning structure which includes an upper, somewhat composite, work supporting plate 30 which overlies the reference plate 19. A lower indexing structure 31 underlies the reference plate. These two plates are appropriately anchored together and rotate through an arc of about 90° corresponding to the 90 degree segment scale. The structure and movement are incidental only and are not pertinent to the invention herein disclosed.

A slot 35 in the supporting plate 30 in alignment with a slot 34 between guide parts 14, 15 is adapted to accommodate the saw blade 17 in extreme position.

To hold the plate 30 in proper engagement there is provided a hand wheel 36 fastened to lower end of a shaft 37 by appropriate conventional means.

The saw slot 35 extends almost through the work supporting plate 30 except for a bottom wall 38 of the saw slot. Sawdust or cuttings as the case may be, are tossed rearwardly of the saw slot and passed through a discharge orifice 39 in a discharge tube 40.

For mounting the saw there is provided a saw platform 41 on which the circular saw blade 17 is rotatably mounted on a shaft 42. An electric motor 43 is mounted at the rear end of the platform and drives the saw blade by means of a belt 44 traveling over pulleys 45 and 46. A belt guard 47 protects the pulleys and belt and is fastened to the platform by a screw 83.

The saw platform 41 has a bracket 50 which is tiltedly mounted on a stationary bracket 51, about a horizontal pivot pin 52. The stationary bracket 51 is provided with a stiffening flange 53.

For moving the saw downwardly to the cutting position of FIG. 4, there is provided a manually acutated arm 54 which is pivotally mounted on a horizontal pivot pin 55, the pivot pin being retained in the lower indexing structure 31, previously made reference to.

The rear end of the manually acutated arm comprises a pair of legs 56, 56' pivotally secured to respective levers 57, 57' by a pin 58 and pivotally secured to the saw platform 41 by a pin 59. Space between manually actuated legs 56, 56' is relatively wide, spanning the structure 31 and provides a clearance opening 60 which amply accommodates the structure.

For protecting the operator the saw is provided with a guard subassembly consisting of a main guard 65 and a nose guard 66. The main guard 65 extends for about 180° over the upper half of the saw blade in a position at rest as shown in FIG. 1. The nose guard 66 is pivotally mounted on the main guard 65 by pivot 67 and extends over more or less the remaining exposed portion of the saw blade 17. The movable nose guard 66 is adapted to be moved relative to the main guard 65 from the position of FIG. 1 to the broken line position of FIG. 4 showed as a work piece 16', as shown by the broken line of FIG. 4. The main guard 65 is resiliently urged in extended position by employment of a V shaped spring 73, one leg 74 of which is anchored in the main guard 65 by an appropriate recess near the rear edge of the main guard, the other leg 76 of which engages a boss 77 on the platform 41. An intermediate wound portion of the spring is carried on a pivot 78.

The main guard 65 actually consists of opposite side plates 80 and 81 providing between them a space 82 which accommodates the saw blade 17. The plates are pivotally supported by means of the pivot 78 on opposite brackets 79 of the platform 41 Pivotally mounted in this fashion the main blade is adapted to be lifted by action of the cam follower 70 on the cam track 71, from the position of FIG. 1 to the position of FIG. 4. The cam track 71 has a slope such that as the platform 41 is lowered by manipulation of the manually actuated arm 54 the cam follower 70 tends to be shifted counterclockwise about the pivot 78 thereby to tilt the main guard 65 in a counterclockwise direction and build up tension in the spring 73. A clearance slot 84 allows the main guard 65 to lower to the position of FIG. 1 over the pulley 46 so that the main guard in fact covers something more than the upper 180° of the saw blade.

After the cutting operation has been completed and the saw blade is again lifted by elevating the manually actuating arm 54 the cam follower 70 rolls rearwardly and upwardly of the cam track 71 from the position of FIG. 4 to the position of FIG. 1. During this movement tension built up in the spring 73 holds the cam follower on the cam track and progressively returns the main guard to its initial position.

Should the main guard 65 be lifted independently of action by the manually actuated arm 54 through some inadvertence, the guard merely moves against tension of the spring 73 until released after which it will again return to initial position.

It is of appreciable consequence to actually avoid having any part of the dual guard subassembly actually touch the work piece thereby to avoid inadvertently marring the surface of the work piece while the piece is being cut. It is for this reason that the dual guard subassembly is automatically lifted during the cutting operation. It is however important for the operator to be able to carefully watch the location of the saw blade 17 with respect to any line on the work piece which the cut is to follow. To accomplish this a portion of the dual guard asubassembly namely the nose guard 66 is made relatively light in weight and appreciably narrower than the main guard 65. As shown the nose guard consists of side panels 85 and 86 joined by an edge piece 87 and providing between the side panels a space 88 for accommodation of the blade 17. By having the side panels 85, 86 spaced close enough together they are adapted to be lodged within the space 82 of the main guard 64 so that the nose guard is mounted within the main guard and can telescope into it whenever occasion might require. To prevent the nose guard from separating outwardly from the main guard there is provided a shoulder 89 on the nose guard at the end opposite from the pivot 67, the shoulder being adapted to engage a stop 90 at the forward edge of the main guard 65.

Normally when the platform 41 and blade 17 are advanced through a cutting operation as shown in FIG. 4, a lowermost edge 91 of the nose guard is automatically kept clear of the work piece 16 by action of the cam follower 70 on the cam track 71. Should the work piece 16 be thicker than normally encountered and circumstances be such that action of the cam follower and cam is not sufficient to lift the edge 91 clear during the initial portion of the cut, the nose guard is capable of telescoping into the main guard when striking the work piece for an inch or two of travel as shown by the broken line position of FIG. 4. Gravity is relied upon to return the nose guard to initial position when the main guard 65 is elevated to its initial position.

Although a cam follower and cam attached to the main guard has been dislosed as the means of retarding movement of the guard with relation to movement of the saw blade itself while a cut is being made it is of consequence to note that the retarding of movement of the blade subassembly is a factor of consequence in preventing contact of the guard with the work piece while the saw blade is moved progressively through it while at the same time adequately covering the teeth in the blade for providing a proper degree of safety from contact with the saw teeth as well as preventing saw dust or chips from being thrown forward toward the operator. Further still, by making both guard portions yieldable, the main guard by virtue of the yielding of the spring tension and the nose guard by merely lifting it, the articulated arrangement is assurance against malfunctioning under exceptional circumstances. The action of both guards moreover is effectively independent of the tilting operation of the saw blade itself and its platform.

Further still although the device has been described in connection with a horizontally rotatable platform as made use of in a mitre saw, the structure and principle is equally adaptable to a pivoting motor operated hand saw devoid of the mitering function.

Having described the invention what is claimed as new in support of Letters Patent is as follows:

1. A guard device for a power operated bench saw wherein a frame is provided with a work surface for supporting a work piece and a motor actuated saw blade is carried by a movable structure on the frame by means of a manually actuatable leverage having attachments respectively to the frame and the movable structure for moving the saw blade between an elevated non-operating position above the work surface and a progressively lowered cutting arc for advancing the blade past the work surface, said movable structure including a guard device comprising a main plate means having a tiltable mounting on said movable structure, a cam follower on said guard device spaced from the tiltable mounting and a cam track in fixed position on said table receptive of said cam follower, said cam having a contour productive of a progressive relative movement of said plate means resulting in a clearance between said guard device and the work piece as the blade is advanced through said cutting arc.

2. A guard device as in claim 1 wherein said main plate means comprises a pair of laterally spaced plates providing a space therebetween for said blade.

3. A guard device as in claim 1 wherein there is a second plate means tiltably mounted on said main plate means and having a position over a portion of the blade not occupied by the main plate means.

4. A guard device as in claim 3 wherein said second plate means comprises a pair of laterally spaced plates providing a space therebetween for said blade, the plates of said second pair being spaced laterally from the main plate means.

5. A guard device as in claim 3 wherein said second plate means has a pivotal mounting on said first plate means.

6. A guard device as in claim 4 wherein the main plate means comprises a pair of laterally spaced plates providing a space therebetween for said blade and wherein the plates of said second pair are spaced closer together than the plates of said main pair and pass the plates of said main pair when moved.

7. A guard device as in claim 5 wherein the plates of said second pair are spaced closer together than the plates of said main pair and pass into the space between said main pair when moved.

8. A guard device as in claim 1 wherein there is resilient means biased between said main plate means and said movable structure in a direction urging said cam follower against said cam track.

9. A guard device as in claim 1 wherein said cam-track is at a location above the lowest perimetrical portion of said blade and there is an arm carrying said cam follower extending from said main plate means in a direction toward said cam track.

10. A guard device as in claim 3 wherein there is a nose portion of said second plate means having an initial position adjacent the circumference of said blade and a clearance between said cam follower on the side remote from said cam track whereby should the nose portion strike a work piece, the cam follower is free to lift from said cam track.

* * * * *